United States Patent [19]

Sutton

[11] Patent Number: 4,995,232

[45] Date of Patent: Feb. 26, 1991

[54] RUNNING CONTROL FOR A GAS TURBINE ENGINE

[75] Inventor: Arthur E. Sutton, Birmingham, England

[73] Assignee: Lucas Industries, Birmingham, England

[21] Appl. No.: 901,039

[22] Filed: Aug. 4, 1986

[30] Foreign Application Priority Data

Aug. 2, 1985 [GB] United Kingdom ............... 8519454

[51] Int. Cl.⁵ .............................................. F02K 3/00
[52] U.S. Cl. ................................... 60/243; 60/39.281; 364/431.01; 364/431.02
[58] Field of Search ................... 60/243, 39.281; 364/431.01, 431.02

[56] References Cited

U.S. PATENT DOCUMENTS 4,517,797  5/1985  Adalni ...................... 60/39.281

Primary Examiner—Donald P. Walsh
Attorney, Agent, or Firm—Finnegan, Henderson, Farabow, Garrett & Dunner

[57] ABSTRACT

A running control for a gas turbine engine includes a fuel control responsive to an input signal which corresponds to a desired rate of change of engine speed. A speed governor circuit generates a first output signal corresponding to a difference between demanded and actual speeds. Limit signal generators provide second and third signals which correspond to permitted acceleration and deceleration respectively. The second and third signals are integrated and a selected one of the first, second or third signals is applied to the fuel control. At least the integrator for the second signal can be reset by a feedback arrangement which modifies the integrator input in accordance with a difference between the desired rate of change of engine speed and the second signal.

4 Claims, 3 Drawing Sheets

RUNNING CONTROL FOR A GAS TURBINE ENGINE

This invention relates to a running control for a gas turbine engine.

A control, which is shown in very simplified diagrammatic form in FIG. 1 of the drawings, has already been proposed in which the output of a difference signal generator 10, suitably shaped by a function generator 11 which has an appropriate speed governor time constant, is passed via low-win and high-win "gates" 12, 13 to a fuel control 14 which has an integral transfer function. The difference signal generator 10 receives inputs from a speed demand signal generator 15 and from an engine speed transducer 16 so that the output of difference signal generator 10 is zero in steady running conditions. In these circumstances the zero signal "wins" the gates 12 and 13 and there is thus a zero input to the fuel control 14 which continues to deliver fuel to the engine at an appropriate constant rate to maintain the speed difference signal at zero. Small fluctuations in engine speed will cause correspondingly small changes in the speed difference signal to alter the fuel control fuel output to correct these fluctuations, thereby providing the required speed governing characteristic, the speed governor time constant and gain being appropriately chosen to ensure stable steady running.

Control of acceleration and deceleration is effected by two further loops which are identical. Each loop has a limit signal generator 16A, 16D the output of which represents the maximum permitted rate of change of engine speed at current operating conditions. Such generators may either receive as input the speed signal and provide limit signals representing a fixed (or variable) percentage of the current speed, or they may receive inputs representing other engine parameters. Each generator 16A, 16D provides an input to an associated integrator 17A, 17D, the output of which represents the currently allowable maximum or minimum engine speed during acceleration or deceleration respectively. These outputs are compared with the actual engine speed in difference signal generating circuits 18A and 18D, the outputs of which go via function generators 19A, 19D which have appropriate acceleration and deceleration time constants (shorter than the governor time constant) to the low-wins and high-wins gates 12 and 13 respectively. Whilst the acceleration loop or deceleration loop is actually in control (e.g. following a sudden change in speed demand) the integrator in that loop provides a signal representing the current limit speed and the difference between that limit speed and the actual speed controls the rate of change of fuel supplied.

Some means is required to control the integrators 17A and 17D when thes are not in the currently controlling loop. The previous proposal envisages a control 20 which receives inputs from the function generators 19A and 19D, comparing these with the current value of the input to the fuel control 14 and holding the integrator outputs reset at values equal to the current value of the speed with an allowance made for any current change in speed resulting from the input to the fuel control 14 being other than zero.

It has been found that this arrangement for resetting of the integrators is unsatisfactory because of the relatively slow response when changing over from governor operation to acceleration or deceleration limit operation.

In accordance with the present invention the integrator in one or each of the acceleration and deceleration loops is reset by means of a feedback arrangement which modifies the input to the integrator in accordance with the difference between the input to the fuel control and the output of the function generator of that loop.

With this arrangement, in steady running conditions, the output of the integrator is held, not at the existing actual speed, but at a level higher in the case of the acceleration loop or lower in the case of the deceleration loop by an amount dependent on the output of the acceleration or deceleration limit signal generator as the case may be.

Feedback of the difference referred to above may be delayed. Furthermore a gain of greater than unity may be included, to ensure that transition from governor operation to rate of change limit operation is accomplished rapidly and without overshoot.

The fuel control itself may incorporate other limiters which operate in certain circumstances. Where such limiters are included it is necessary to simulate the action of such limiters and to generate a signal representing the input to the fuel control which would have produced an effect similar to these limiters and to use this signal in the feedback arrangement instead of the actual input to the fuel control. Such an arrangement should be deemed to fall within the scope of the present invention.

Figure 1:
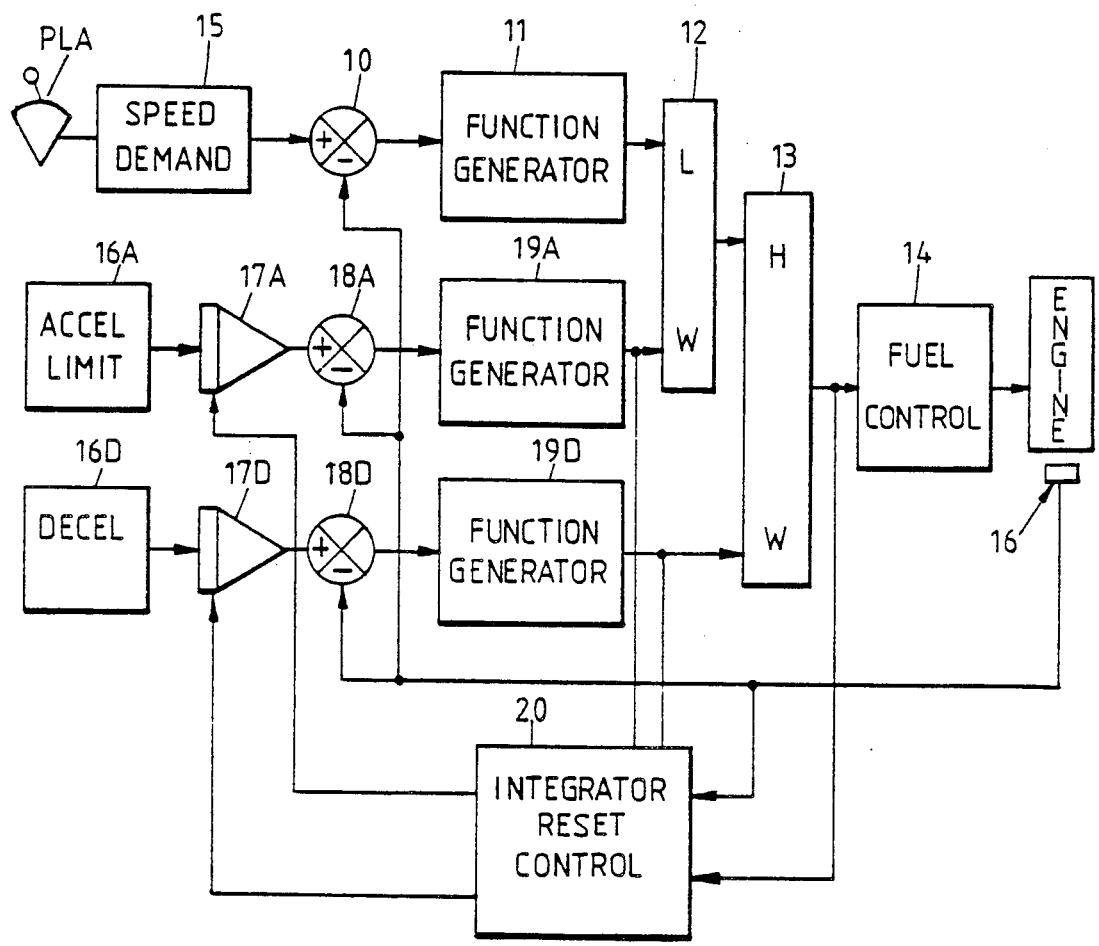
FIG. 1 is a block diagram of a previously proposed running control for a gas turbine engine.
Figure 2:
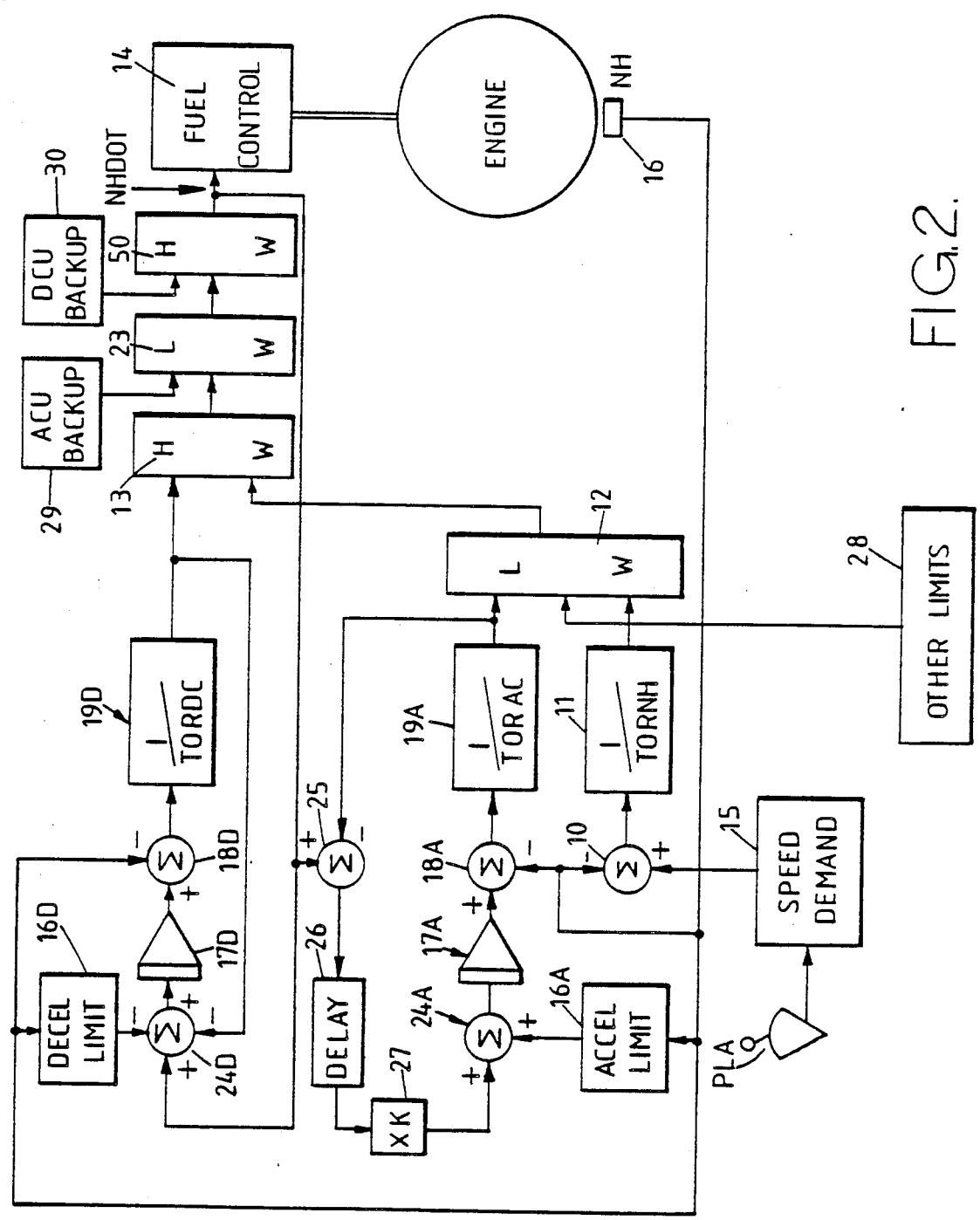
FIG. 2 is a block diagram of an example of the invention.

Referring firstly to FIG. 2 the same reference numerals are used as those used in FIG. 1, where appropriate. The pilots throttle lever, marked PLA, provides an input to the speed demand signal generator 15, the output of which is compared with a signal representing the actual engine speed NH from a speed transducer 16 by means of a speed error signal generator 10. A function generator 11 with an appropriate time constant and gain provides an output signal which, during normal running passes via a low wins gate 12, a high wins gate 13, another low wins gate 23 and another high wins gate 50 to the fuel control 14 which has an integral transfer characteristic so that the rate at which the flow of fuel to the engine changes is proportional to the input signal it receives.

The acceleration limit signal generator 16A provides an acceleration limit signal which is applied via a summer 24A to an integrator 17A the output of which is applied to another summer 18A which compares the actual engine speed with the currently permitted maximum speed represented by the output of integrator 17A and provides another error signal to gate 12 via a function generator 19A. A similar arrangement 16D ,24A, 17D, 18D and 19D is provided for deceleration control and its output is supplied to gate 13.

Instead of the integrator reset circuit 20 of FIG. 1, the example shown in FIG. 2 employs an integrator reset arrangement which relies on varying the input to the integrator 17A or 17D in accordance with the difference between the output of the associated function generator 19A or 19D and the actual input to the fuel control 14.

The simplest form of integrator reset arrangement is shown in relation to the deceleration loop. Here, the summer 24D receives the deceleration limit signal from generator 16D, the output of gate 50 and the output of generator 19D, in such polarities that, in steady state (i.e. when the input to the fuel control 14 is zero), the output of the integrator takes up a level such that the output of generator 19D is of equal magnitude and opposite polarity to the output of generator 16D (the signal feedback from the input to the fuel control being zero in these conditions). Thus the input to integrator 17D is zero and its output is just sufficiently less than the speed signal to maintain this level of output from generator 19D. Following a "step" change in the speed demand signal resulting from a change in the position of the pilots lever to demand deceleration, the output of gate 50 becomes equal to the output of generator 19D. The effect of this is to make the input to integrator 17D equal in magnitude to the output of generator 16D, but of negative polarity so that the output of integrator 17D ramps downwardly and the actual engine speed follows this trend.

The acceleration integrator reset loop is more complex and includes an additional summer 25 receiving inputs from the output of generator 19A and from the gate 50.

The output of summer 25 is applied via a delay circuit 26 and gain block 27, applying a gain KA, greater than unity to the delayed signal from the summer 25, to the summer 24A. The gain block 27 has the effect of setting the output of the generator 19A at a fraction of the output of the generator 16A in steady state conditions (output of gate 23 at zero). In this case, following a step increase in speed demand there is a delay between the instant when the output of generator 19A starts to win the gate 12 and the instant when the reset loop of the integrator is overridden. Thus, although the output of summer 25 goes to zero as soon as generator 19A starts to win, the input to the summer 24A from the gain block 27 will remain unchanged until the delay imposed by delay circuit 26 expires. Thus the output of integrator 17A remains substantially constant during this interval, enabling the error signal produced by summer 18A to remain steady. When the output of gain block falls to zero at the end of the delay and transition from governor operation to acceleration limit operation is achieved rapidly, but smoothly and without significant overshoot. Similarly when the new demanded speed is approached, the delay+gain arrangement in the acceleration contol integrator reset loop ensures that transition from acceleration limit control to governor control is effected smoothly and without overshoot.

Figure 3:
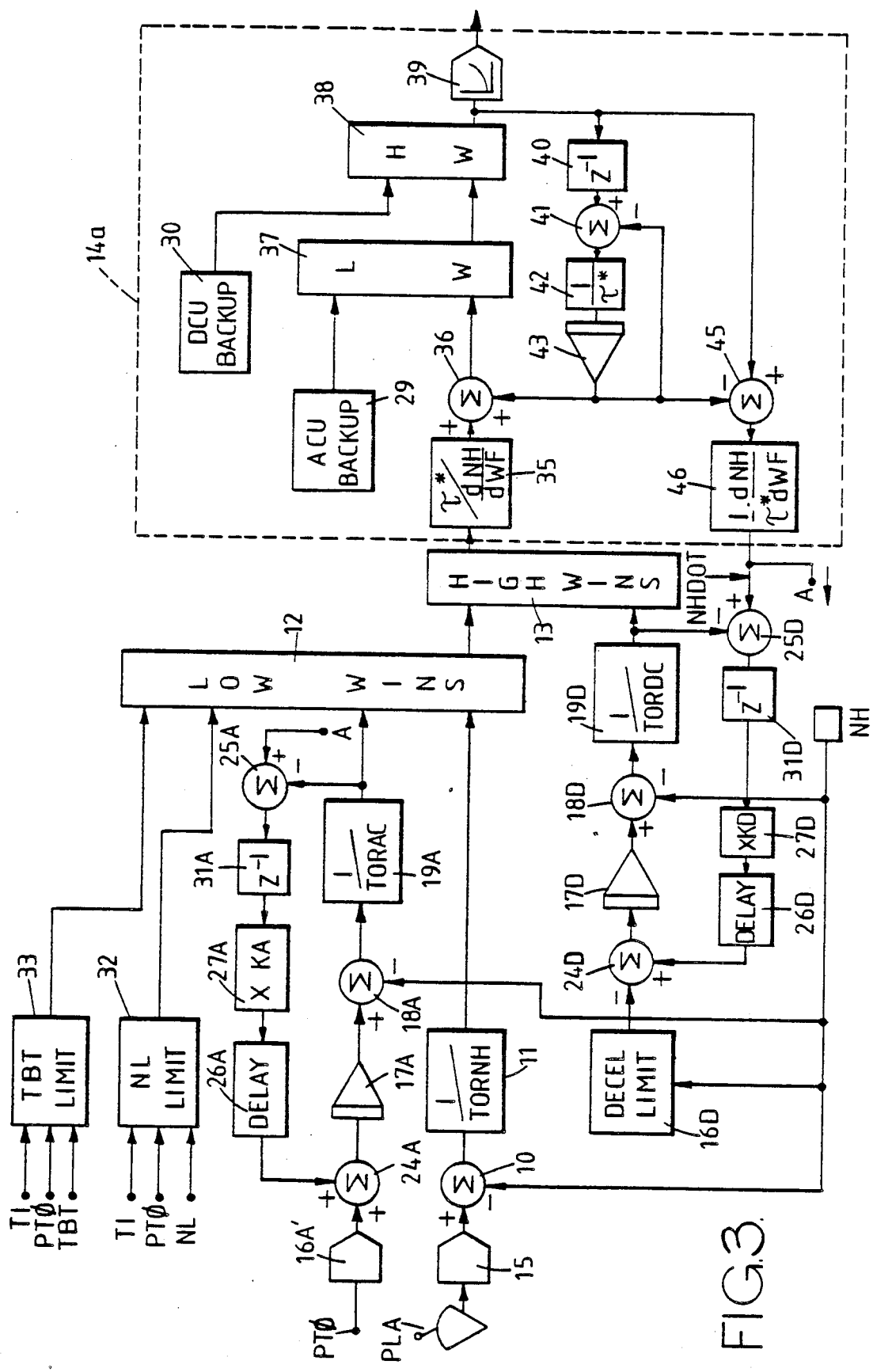
FIG. 3 is a block diagram of another example of the invention.

In the example of the invention shown in FIG. 3 rather more detail is given of the manner in which the "other limits" 28, ACU backup 29 and DCU backup 30 functions are incorporated. Once again similar reference numbers are given to parts already described. The deceleration and acceleration integrator reset loops are now identical to one another and in addition to the blocks included in these loops in FIG. 2 each is shown to include an additional box 31A, 31D, marked $Z^{-1}$. This box represents use in the loop of data which is one cycle out-of-date. The syatem as a whole is realized by means of a computer operating to carry out the various functions indicated by the blocks cyclically and the $Z^{-1}$ blocks indicate use of data generated in the previous operating cycle. It will also be noted that in FIG. 3 the function generator 16A' derives the acceleration limit signal as a function of total pressure at the engine air intake PTφ.

The "other limits" indicated in FIG. 2 are shown in FIG. 3 to be function generators 32, 33 which receive signals from which the limit value of the parameter to be limited can be calculated, compare the actual measured value of the parameter with the calculated limit and produce a limit signal which wins the gate 12 only if the limit is reached. Generator 32 limits the low pressure spool speed NL (NH being the high pressure spool speed) as a function of ambient air temperature T1 and total pressure PTφ. Generator 33 limits turbine blade temperture TBT as a function of the same parameters.

FIG. 2 shows the ACU backup 29 and the DCU backup 30, which are backup systems for overriding the controller if stall or flameout conditions are being approached during acceleration or deceleration, entering the system at the gates 23 and 50 respectively. It is, however, desirable to place these functions as "late" in the control as possible so as to have them available in the event of a system failure. FIG. 3 actually shows a dotted block 14a which forms a part of the fuel control 14. This part of the fuel control is actually required to convert the NHDOT into a WF signal (i.e. it converts the rate of change of speed demand signal into a fuel flow signal). To this end the NHDOT input to block 14a is applied to a converter 35 which has the transfer function $$\tau^* \div \frac{dNH}{dWF}$$

where $\tau^*$ is the estimated time constant of the loop comprising fuel flow control and the engine. A summer 36 adds the output of converter 35 to a signal representing the estimated current fuel flow and the resulting signal is applied via a low wins gate 37 and a high wins gate 38 to an output function generator 39 intended to linearise the fuel valve drive which follows it (so that no fuel flow transducer is required). The output of high wins gate is applied via a one cycle delay 40 to one input of a summer 41 the output of which goes to a function generator 42 providing the transfer function $1/\tau^*$, the output of which is applied to an integrator 43. The output of integrator 43 is fed back to summer 41 and also applied to summer 36. With this arrangement the output of integrator 43 represents the existing fuel flow calculated in the previous data processing cycle.

The ACU backup 29 is applied to gate 37 and the DCU backup 30 is applied to gate 38. Since these functions are introduced after conversion from NHDOT to WF, an actual NHDOT signal representing the required rate of change does not exist at any point in the system so far described, when either of these functions takes effect. It is, however, required to use the NHDOT signal to feedback to the acceleration and deceleration integrator reset loops.

As shown in FIG. 3 the control 14a includes a simulator for producing a signal NHDOT[1] which represents the NHDOT signal which would have had the same effect on the output of gate 38 had the control not been overridden by one of the other functions. As shown, this simulator merely consists of a summer 45 which substracts the output of integrator 43 from the output of gate 38 (this simulates WFDOT) and a function generator 46 with the transfer function $$(\tau^*)^{-1} \times \frac{dNH}{dWF}.$$

This signal is fed to the summers 25A and 25D of the integrator reset loops.

It will thus be seen that the control described avoids the disadvantage referred to above and ensures that the acceleration and deceleration integrators are kept properly reset at all times when not actually in control of fuel flow.

I claim:

1. In a running control for a gas turbine engine having a fuel flow control which receives as input a signal representing a desired rate of change of engine speed, a speed governor circuit which receives a demand speed signal and an actual speed signal and provides a first output signal determined by the difference between said speed signals, an acceleration control circuit and a deceleration control circuit, each control circuit including a limit signal generator the output of which represents the maximum permitted rate of change of engine speed in current operating conditions and each control circuit also including an integrator connected to integrate the output of the respective limit signal generator and means for generating second and third output signals determined by the difference between the output of the respective one of the integrators and the actual engine speed, selection means for selecting whether the first, second or third output signal is applied to the fuel flow control as the input thereof and means for resetting the integrators of the acceleration and deceleration control circuits, the improvement wherein the integrator resetting means of at least one of the acceleration and deceleration control circuits comprises a feedback arrangement which modifies the input to the integrator of that control circuit in accordance with the difference between the input to the fuel flow control and the second or third output signal as the case may be.

2. A running control as claimed in claim 1 in which the feedback arrangement further comprises delay means for delaying feedback of said difference.

3. A running control as claimed in claim 2 in which said feedback arrangement has a gain of greater than unity.

4. A running control as claimed in any preceding claim in which the fuel flow control incorporates limiting means operable to determine the fuel flow to the engine independently of the input thereto, means being provided to simulate the input which would have been required to obtain the actual resulting fuel flow and for supplying such simulated input to the feedback means.

* * * * *

UNITED STATES PATENT AND TRADEMARK OFFICE
CERTIFICATE OF CORRECTION

PATENT NO. : 4,995,232

DATED : February 26, 1991

INVENTOR(S) : Arthur E. Sutton

It is certified that error appears in the above-identified patent and that said Letters Patent is hereby corrected as shown below:

COLUMN 6

Claim 4, line 1, delete "any preceding" and insert --anyone of claims 1, 2 or 3--; and line 2, delete "claim".

Signed and Sealed this

Twenty-eighth Day of July, 1992

*Attest:*

DOUGLAS B. COMER

*Attesting Officer*  *Acting Commissioner of Patents and Trademarks*